United States Patent [19]

Moore, Jr.

[11] Patent Number: 5,323,720
[45] Date of Patent: Jun. 28, 1994

[54] REVEGETATION METHOD
[75] Inventor: Robert L. Moore, Jr., Gillette, Wyo.
[73] Assignee: Atlantic Richfield Company, Los Angeles, Calif.
[21] Appl. No.: 984,649
[22] Filed: Dec. 2, 1992
[51] Int. Cl.[5] ............................................. A01C 7/08
[52] U.S. Cl. .................................... 111/8; 111/186; 111/197; 111/900
[58] Field of Search ................................ 111/900-901, 111/902, 8, 130, 186-187, 197-200; 47/1.01, DIG. 10

[56] References Cited
FOREIGN PATENT DOCUMENTS
1558321 4/1990 U.S.S.R. ............................. 111/902

OTHER PUBLICATIONS
"How to Reseed Utah Range Lands", Intermountain Forest and Range Experiment Station, Research Paper #1, Jun. 1943.

Primary Examiner—Clifford D. Crowder
Assistant Examiner—Michael A. Neas
Attorney, Agent, or Firm—Michael E. Martin

[57] ABSTRACT

Surface mined lands are reseeded by dispensing grass, forb and shrub seed from a seed drill with seed-dispensing boxes connected to plural dispensing tubes which drop seed on the earth's surface and wherein at least one seed box is operable to dispense cool season grass seed through conventional opener assemblies into furrows formed thereby. An English tine harrow drag is pulled behind the seed drill to cover and distribute seed to provide improved species diversity and desired shrub density on the seeded area. Fine seed shrubs are broadcast by the drill during traversal of the seeded area in a direction generally perpendicular to the first seeding operation. Companion crops of annual grain are seeded with native grass, forb and shrub seed and mowed prior to seedhead maturity to prevent reseeding and to provide cover and protection for native seedlings. Improved species diversity, shrub density and overall revegetation success is provided for semi-arid lands, in particular.

8 Claims, 1 Drawing Sheet

REVEGETATION METHOD

BACKGROUND OF THE INVENTION

Field of the Invention

The present invention pertains to a revegetation method for establishing a diverse vegetation community of warm and cool season grasses, forbs and shrubs on reclaimed surface mined lands in a semi-arid climate.

Revegetation of surface mined lands has been somewhat challenging in the semi-arid climate of the Powder River Basin in northeastern Wyoming. Historically, it has been difficult to attain a suitable diversity of warm and cool season grasses, forbs and shrubs. Cool season grasses have often dominated the reclaimed vegetation community. Regulatory requirements and conservation efforts directed to revegetating disturbed lands have been attempted using commercially available native seeding equipment and standard mulching practices of applying two tons/acre of straw/mulch on seeded areas to retain soil moisture and prevent rill and gully erosion. These efforts have not been entirely successful or cost-effective. Improved methods of establishing diverse vegetative communities have been sought along with reduced cost of the revegetation effort. The present invention is directed to improving the establishment of diverse vegetation on reclaimed surface mined lands in semi-arid climates with a successful method described herein.

SUMMARY OF THE INVENTION

The present invention provides an improved revegetation method, particularly adapted for revegetating lands which have been reclaimed from surface mining operations. The method is useful, in particular, for the semi-arid climate of the northwestern United States.

In accordance with an important aspect of the present invention, an improved seeding method is provided in which a modified seeding apparatus is used to substantially broadcast certain seeds on the surface while other seeds are drilled or planted in furrows formed by the apparatus. Seed covering is improved by a drag or harrow towed behind the seeding apparatus to cover different seed at appropriate depths, reduce the row effect of the drilled seed and to distribute the seed more evenly for improved plant species diversity.

Still further in accordance with the present invention, a seeding method is provided wherein five cool season grass species are drilled into furrows which are then covered by a drag or flexible tine harrow device, while seven species of warm season grasses, four forb species and three shrub species are broadcast on the surface. Nineteen species of grasses, forbs and shrubs are seeded in one pass of the apparatus and a second pass is carried out with two species of shrubs which are broadcast seeded without use of any covering apparatus so as to replicate the natural seeding of these two species whose seed simulate a fine powder.

Still further in accordance with the present invention, a seeding method is provided wherein standard mulching practices are eliminated in lieu of seeding companion crops of annual grain along with the native grasses, forbs and shrubs.

The above-noted advantages and superior features of the present invention together with other superior aspects thereof will be further appreciated by those skilled in the art upon reading the detailed description which follows in conjunction with the drawing.

DESCRIPTION OF PREFERRED EMBODIMENTS

The above-mentioned drawing figures are shown in somewhat schematic or simplified form in the interest of clarity and conciseness.

Revegetation of surface mined reclaimed lands and other drastically disturbed lands is an important consideration in maintaining suitable environmental conditions. The coal-rich Powder River Basin of northeastern Wyoming, for example, has proven to be a challenging environment with respect to revegetation of land which has been reclaimed after completion of surface mining operations. Adequate vegetation cover, biomass production, species diversity and shrub density are standard measures of revegetation success. Of these criteria, desired levels of species diversity and shrub density have been the most difficult to accomplish. Experimentation with seed mixes, seeding methods, irrigation and fertilization has been conducted. The seeding of so-called companion crops, planted in lieu of the standard reclamation practice of spreading mulch over seeded areas, has been among other novel techniques which have provided improved species diversity and shrub density. The method described hereinbelow has been demonstrated to meet the requirements of the Surface Mining Control and Reclamation Act of 1977 and, in fact, exceeds the standards set by this legislation. The method described below is suitable for reclaiming lands in the above-mentioned area, although it is contemplated that the method would apply equally well to other lands, particularly in semi-arid and continental climates having a wide variation in annual precipitation.

Figure 1:
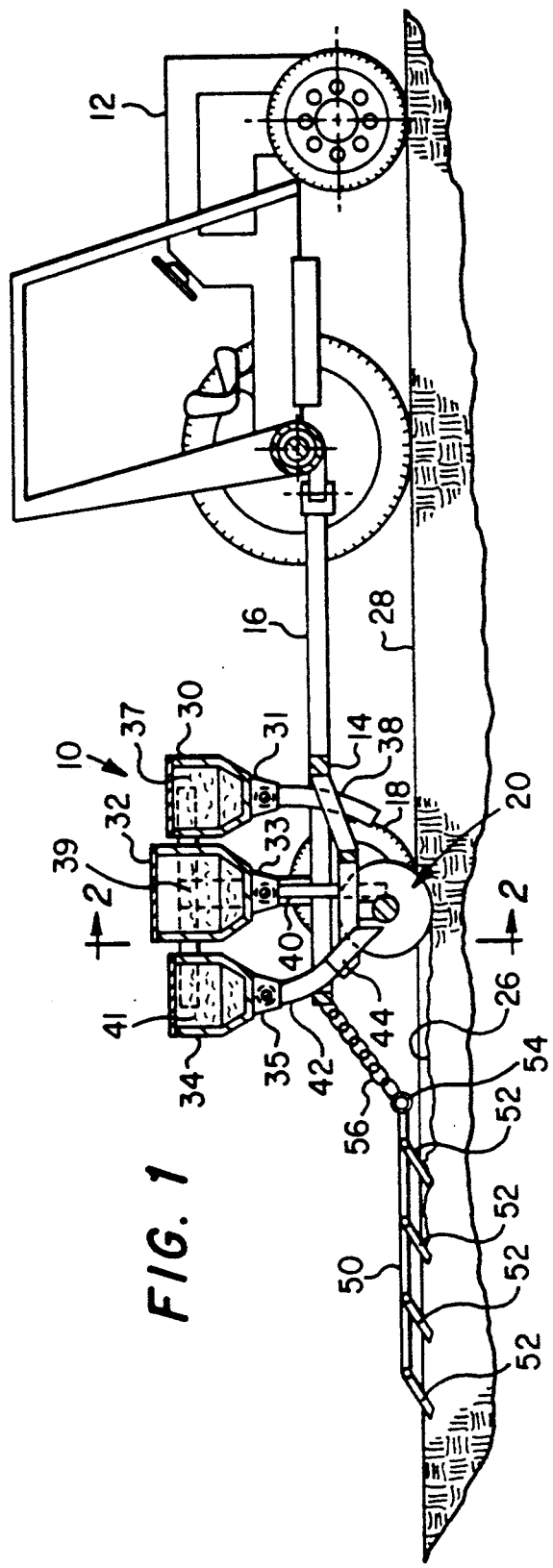
FIG. 1 is a side elevation of a tractor-pulled native seed drill which has been modified to practice the seeding method of the present invention.
Figure 2:
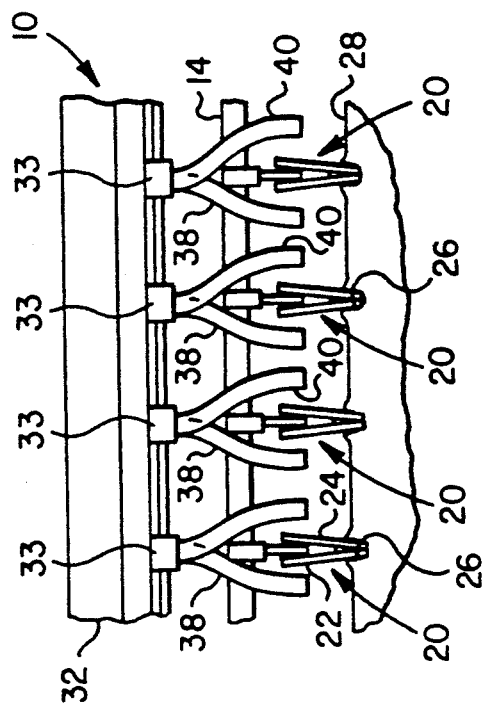
FIG. 2 is a view taken substantially from the line 2—2 of FIG. 1.

Referring to FIG. 1, one aspect of the improved seeding method of the present invention is illustrated in the form of a native seed drill generally designated by the numeral 10. The seed drill 10 is adapted to be towed by a conventional farm tractor 12 and may be of a type commercially available such as a Model 812 or 816 Native Seed Drill manufactured by Truax Company, Inc., Minneapolis, Minnesota. The seed drill 10 has a frame 14 including a conventional tow bar 16 for connection to the tractor 12. The frame 14 is supported on conventional pneumatic tired support wheels 18, one shown in the generally longitudinal central section view of FIG. 1. The frame 14 is adapted to support a plurality of conventional seed drill opener assemblies 20, see FIG. 2 also, which are spaced apart in a transverse direction with respect to the direction of movement of the drill. A representative number of opener assemblies 20 is illustrated in FIG. 2. The opener assemblies 20 each include spaced apart opener wheels 22 and 24 arranged in a conventional manner to provide a furrow 26, see FIGS. 1 and 2, as the drill 10 traverses the earth's surface 28.

The seed drill 10 also includes three transversely-extending, elongated seed boxes 30, 32 and 34, respectively. Each of the seed boxes has a plurality of seed-receiving and feed-control or metering mechanisms generally designated by the numerals 31, 33 and 35. These mechanisms are shown by way of example in FIG. 2 for the seed box 32 as being spaced apart and generally aligned with each of the opener assemblies 20. The feed mechanisms 31, 33 and 35 are generally characterized by rotating cog wheels which are in communication with the respective seed boxes and which function to meter seed flow from the boxes to respective seed feed tubes 38, 40 and 42, FIG. 1. In the conventional Truax seed drill, the respective sets of feed tubes 38, 40 and 42 communicate with the space between the wheels 22 and 24 of the opener assemblies 20 so that seed can be "drilled" into the furrows 26. However, in the modified seed drill 10, the tubes 38 and 40 are disposed so that their distal ends are not in communication with the opener assemblies 20 but descend generally directly downwardly from the respective seed feeding or metering mechanisms 31 and 33 so that seed dropping through these feed tubes 38 and 40, for example, is broadcast substantially onto the surface 28. FIG. 2 illustrates one arrangement of the seed tubes 38 and 40. The lower distal ends of each of the feed tubes 38 and 40 preferably terminate about 3 to 6 inches above the surface 28. The feed tubes 42 are directed into the opener assemblies 20 in a conventional manner and are in communication with an open ended conduit 44, FIG. 2, which extends between the opener wheels 22 and 24.

The seed boxes 30, 32 and 34 are each adapted to meter or feed a particular type of seed. For example, the box 30 is adapted to receive relatively fine seed 37 such as Sand dropseed, Cicer milkvetch, Alkali sacaton, Prairie coneflower, and Alfalfa, which are broadcast onto the surface 28 through the tubes 38 at a controlled rate of about six pure live seed (PLS) pounds per acre. In a similar manner, the tubes 40, which are preferably smooth-walled instead of the conventional convoluted or so-called accordion type tubes, are adapted to broadcast seed 39 from the seed box 32 onto the surface 28. For the seeding operations in the Powder River Basin, seed such as Little bluestem, Blue grama, Winterfat and Prairie sandreed are broadcast onto the surface 28 to improve distribution across the width of the drill 10 to provide more even seeding and to reduce its competition with other seeds such as Sainfoin. Finally, the seed 41 disposed in the seed box 34 is preferably that of several species of wheatgrasses such as Slender wheatgrass, Thickspike wheatgrass, Streambank wheatgrass and Western wheatgrass, which, together with Green needlegrass, for example, are seeded through the opener assemblies into the furrows 26.

Still further, it has been discovered that the drilled seed which is deposited in the furrows 26 through the opener assemblies 20 was subject to a "row" effect, particularly when the conventional seed drill 10 included conventional press wheels, not shown, behind each of the opener assemblies for pressing the seed into the soil. Lessening of the row effect together with improved seed covering has been accomplished by eliminating the press wheels and by providing a towed drag 50, FIG. 1, directly behind the seed drill 10. The drag 50 comprises an English tine harrow having plural transversely and longitudinally spaced tines 52 arranged in the trailing mode, as illustrated in FIG. 1. A preferred size of the drag is approximately 4 feet long by 8 feet wide towed directly behind the drill 10 by a transversely extending crosstree 54 connected to suitable tow chains 56 at each end, one shown in FIG. 1. However, the width of the drag will vary with the width of the drill.

The improved seeding method of the present invention is carried out after soil preparation by primary tillage with a conventional chisel plow and secondary tillage with a conventional roller harrow, not shown. Seeding is conducted by conventional multiple traversals of the area to be seeded with the seed drill 10 in parallel passes while seeding nineteen species of grasses, forbs and shrubs. An improved shrub seeding has resulted from applying fine shrub seeds such as Big Sagebrush and Rubber Rabbitbrush which are broadcast from the drill 10 by way of the seed box 30 on a second pass over the area to be seeded wherein the second pass is accomplished by traversing the seeded area with the drill 10 in plural parallel passes generally perpendicular to the parallel traversals of the initial seeding. The second pass is also carried out without the use of the drag 50. In this way, replication of the natural methods of reseeding of these fine shrub seeds is accomplished.

The above-mentioned seeding method has resulted in approximately doubling the species diversity per square meter of reclaimed land as compared with conventional seeding methods using a conventional native seed drill with all seeds being sown through the opener assemblies and with the seeds being covered by conventional press wheels. For example, at the Black Thunder Mine of Atlantic Richfield Company near Wright, Wyoming, species diversity has increased from a prior average range of 2.5 to 5.0 species per square meter to 5.0 to 9.9 species per square meter.

Seedings in the region in question should be carried out from mid March to about June 1 and from about the last week of September to about December 1 or until the surface is frozen.

The improved seeding method of the present invention also contemplates elimination or substantial reduction of the conventional practice of mulching with blown and crimped straw/hay mulch on seeded areas at the conventional rate of 2.0 tons per acre. Mulching, although widely used, has certain disadvantages. Mulch application must be carried out with little or no wind present during the application process. Mulch is a source of contaminants such as noxious weeds. Uniform application is difficult and too much mulch can inhibit vegetation establishment. Mulch application is, of course, also time consuming and relatively expensive. The range lands of northeastern Wyoming face a very narrow mulch application window, that is, low or no wind conditions.

Accordingly, companion crop seeding has been carried out to provide a companion crop to the native species of grass, forbs and shrubs. For example, conventional annual grain seed has been included in the native species seeding at a rate of about 5.0 PLS pounds per acre. Observation of areas such as relatively level portions of reclaimed topsoil and overburden stockpiles indicate that these areas, which were not mulched, were just as successfully reseeded as certain slope areas which were mulched, if not more so. Moreover, it has been discovered that by increasing the seeding rate of companion crops to about 7.5 to 10.0 pounds per acre on areas with minor topography, that mulching could be eliminated altogether. Such seeding, however, does require mowing the seed heads of the annual grains prior to maturity, such as in early July for northeastern Wyoming, to prevent reseeding and subsequent competition of these plants with the native species. Still further, the mowed material provides a thin layer of mulch on top of the perennial seedlings that provides some protection and helps retain soil moisture. Concerns about competition from so-called companion crops adversely affecting the establishment of perennial species have not been realized. The space occupied by companion crops such as Barley and Winterwheat has only displaced some of the annual forbs such as Russian thistle and Kochia. The density of annual forbs in the areas mentioned above has been reduced in the first growing season by companion crops. Spring seedings of these crops has reduced vegetation costs by over 50% by eliminating the mulch application. Moreover, it has been determined that in the above-mentioned region, fertilization and irrigation can be successfully eliminated since, from observation, it is indicated that fertilizers mainly benefit annual forbs in the first growing season only. These species best survive over time if they establish under natural range conditions.

The above-mentioned revegetation seeding method for the range and grasslands of northeastern Wyoming can be successfully applied in other areas of similar topography. Moreover, the species diversity and desired shrub density can also be improved and the so-called row effect diminished by utilizing a seed drill modified in the abovedescribed manner.

Although a preferred embodiment of a seeding method in accordance with the present invention has been described herein, those skilled in the art will recognize that certain substitutions and modifications can be made without departing from the scope and spirit of the invention as recited in the appended claims.

What is claimed is:

1. A method of seeding semi-arid lands and the like comprising the steps of:
    providing a seed drill having a plurality of spaced-apart furrow opener assemblies and plural seed boxes, each provided with seed metering means and seed dispensing conduit means;
    traversing said seed drill over an area of the earth's surface while broadcasting native grass, forb and shrub seed through said conduit means directly onto the earth's surface and seeding at least one cool season grass species through said opener assemblies into furrows formed thereby; and
    providing drag means traversing said area after seeding to cover broadcast seed and seed in said furrows.

2. The method set forth in claim 1 including the step of:
    seeding a predetermined area of the earth's surface in a first seeding by traversing said area by multiple, substantially parallel passes.

3. The method set forth in claim 2 including the step of:
    seeding a predetermined number of fine shrub seeds by broadcasting said fine shrub seeds from said seed drill through one of said seed boxes and associated conduit means onto the earth's surface in repeated traversals of said area in a direction generally perpendicular to the direction of traversal of said seed drill during said first seeding.

4. The method set forth in claim 1 including the step of:
    seeding said area with a companion crop of annual grain.

5. The method set forth in claim 4 including the step of:
    mowing said companion crop when growing and prior to seed-head maturity of said companion crop to provide covering for seedlings resulting from said native seeds to minimize soil erosion and prevent reseeding of annual grain.

6. A method of seeding semi-arid lands of northeastern Wyoming and the like comprising the steps of:
    providing a seed drill having a plurality of spaced-apart furrow opener assemblies and plural seed boxes, each provided with seed metering means and seed dispensing conduit means;
    traversing said seed drill in a first seeding over a predetermined area of the earth's surface in multiple parallel passes while broadcasting native grass, forb and shrub seed through said conduit means directly onto the earth's surface and seeding at least one cool season grass species through said opener assemblies into furrows formed thereby;
    dragging said area to cover said broadcast seed and seed in said furrows; and
    seeding a predetermined number of fine shrub seeds by broadcasting said fine shrub seeds from said seed drill through one of said seed boxes and associated conduit means onto the earth's surface in repeated traversals of said area in a direction generally perpendicular to the direction of traversal of said seed drill during said first seeding.

7. The method set forth in claim 6 including the step of:
    seeding said area with a companion crop of annual grain.

8. The seeding method set forth in claim 7 including the step of:
    mowing said companion crop when growing and prior to seed head maturity to provide covering for seedlings resulting from said native seeds, minimize soil erosion and prevent reseeding of annual grain.

* * * * *